United States Patent Office 3,061,605
Patented Oct. 30, 1962

3,061,605
(AMINO-BENZENESULFONYLAMINO)-s-TRIAZINE DERIVATIVES
Gaetano F. D'Alelio, South Bend, Ind., assignor, by direct and mesne assignments, to Dal Mon Research Co., Cleveland, Ohio, a corporation of Delaware
No Drawing. Filed Jan. 18, 1960, Ser. No. 2,857
12 Claims. (Cl. 260—239.7)

This invention relates to the production of new chemical derivatives and more particularly to triazine derivatives. The invention especially is concerned with the production of new and useful aminoarylsulfonyl-hydrazino-substituted triazines.

The chemical compounds of this invention may be represented by the following general formula,

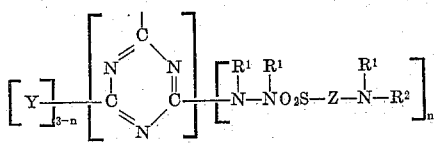

where $n$ represents an integer and is at least one but no more than three, $R^1$ represents a member of the class consisting of hydrogen and monovalent hydrocarbon radicals, $R^2$ represents a member of the class of H and acyl radicals, and Y represents a member of the class of Br, Cl, $OR^1$ and

wherein $R^3$ and $R^4$ each represent $R^1$ and the pair of radicals $R^3$ and $R^4$ together with the nitrogen atom constitute a member selected from the group of five- to six-membered alkylenimino radicals and the morpholino radical; and Z represents a divalent aromatic radical.

Illustrative examples of the radicals that $R^1$ in the above formula may represent are: aliphatic (e.g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e.g., cyclopentenyl, cyclohexyl, cyclohexenyl, cycloheptyl, etc.); aryl (e.g., phenyl, diphenyl, xenyl, naphthyl, etc.); aliphatic-substituted aryl (e.g., tolyl, xylyl, ethylphenyl, propylphenyl, allylphenyl, etc.); aryl-substituted aliphatic (e.g., benzyl, phenylethyl, phenyethyl, phenypropyl, etc.); etc.

Illustrative examples of aryl and substituted aryl radicals that Z in the above formula may represent are —$C_6H_4$—, —$C_6H_3(CH_3)$—, —$C_6H_4$—$C_6H_4$—,
—$C_{10}H_6$—, —$C_6H_3(C_2H_5)$—, $C_6H_2(C_2H_5)_2$—,
—$C_6H_3Cl$—, $C_6H_3(C_3H_7)$—, —$C_6H_3(C_3H_5)$—,
—$C_6H_3Br$—, —$C_6H_3I$—, etc. Preferably the hydrocarbon radicals contain no more than twelve carbon atoms.

Illustrative examples of the acyl radicals that $R^2$ in the above formula may represent are:

HCO—, $CH_3CO$—, $C_2H_5CO$—, $C_3H_7CO$—,
$(CH_3)_2CHCO$—, $C_4H_9CO$—, $C_{16}H_{33}CO$—, $C_{18}H_{26}CO$—,
$C_6H_{11}CO$—, $CH_3C_6H_{10}CO$—, $C_6H_5CO$—, $CH_3C_6H_4CO$—,
$ClC_6H_4CO$—, $C_{10}H_7CO$—, etc. and may be aliphatic, cycloaliphatic and aromatic radicals.

The new compounds of this invention may be used, for example, as plasticizers for other polymers especially the amidogen resins such as the melamine-formaldehyde, urea-formaldehyde, aniline-formaldehyde, etc. resins. Some of these new compounds are especially valuable in the preparation of synthetic resins compositions; thus, those compounds having at least one —$NH_2$ group, or at least two —NH— groups, may be condensed with, for instance, aldehydes, including formaldehyde, to yield condensation products of particular utility in the plastics and coating arts. Other compounds of this invention, particularly the halogeno-derivatives are useful as intermediates in the preparation of other new and useful organic compounds; for example, the halogenated derivatives of this invention may be hydrolyzed to the hydroxy derivatives, or may be reacted with alcohols to alkoxy derivatives or reacted with ammonia or amines to produce amino derivatives suitable for the growth control of lucerne; and the alkoxy derivatives are useful in the preparation of amino derivatives from which polymeric compositions are readily prepared.

Various methods may be used to produce the chemical compounds of this invention. One method of preparing them is to effect reaction, in the presence of a hydrohalide acceptor, between a hydrazino-substituted triazine and a suitably substituted amino arylsulfonyl chloride, e.g.

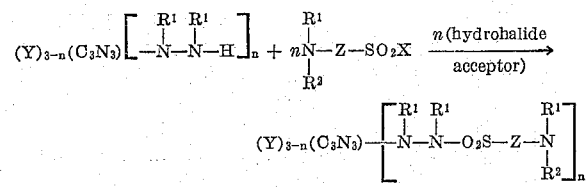

wherein $R^2$ is an acyl radical, $C_3N_3$ represents the triazine ring and X is halogen.

Illustrative examples of hydrazino triazines that may be employed in the above reaction, depending upon the particular end-product desired are: 2,4 diamino-6-hydrazino-s-triazine, 2,4 di-(methylamino)-6-hydrazino-s-triazine, 2,4 di-(ethylamino)-6-hydrazino-s-triazine, 2,4 di-(propylamino)-6-hydrazino-s-triazine, 2-amino-4,6 di-(hydrazino)-s-triazine, 2,4,6 tri-(hydrazino)-s-triazine, 2 - methylamino - 4,6 di-(methylhydrazino) - s - triazine, 2-methylamino-4,6, di-(sym.dimethylhydrazino)-s-triazine, 2-diethylamino-4,6 di-(hydrazino)-s-triazine, 2,4-di-(diethylamino) - 6 - phenylhydrazino - s-triazine, 2 amino-4-morpholino-6-hydrazino-s-triazine, 2,4 di-(morpholino)-6-hydrazino-s-triazine, 2,4 di-(piperidino)-6-hydrazino-s-triazine, 2,4 di-(pyrrolidino)-6-hydrazino-s-triazine, 2,4 di - (phenylethylamino) - 6 - hydrazino-s - triazine, 2,4 di-(anilido)-6-hydrazino-s-triazine, 2,4 di-(naphthylamino)-6-(methylhydrazino)-s-trianzine, 2,4 di - (cyclohexylamino)-6-cyclohexylhydrazino)-s-triazine, 2 methylamino, 4 allylamino-6-hydrazino-s-triazine, 2,4 di-(allylamino)-6-phenylhydrazino-s-triazine, 2,4 di-(diallylamino)-6-hydrazino-s-triazine, 2,4,6 tri-(phenylhydrazino)-s-triazine, etc.

Illustrative examples of acylated aminoarylsulfonyl halides that may be used in the above reaction, depending on the desired end-product are:

$HCONHC_6H_4SO_2Cl$, $CH_3CONHC_6CSO_2Br$,
$CH_3CONHC_6H_3(CH_3)SO_2Cl$,
$_2H_5CONHC_6H_4SO_2Cl$,
$CH_3CONH(CH_3)C_6H_4SO_2Cl$,
$CH_3CONHC_{10}H_8SO_2Cl$,
$C_6H_5CON(C_2H_5)C_6H_4SO_2Cl$,
$C_6H_{11}CONHC_6H_4SO_2Cl$, etc.

Various hydrohalide acceptors may be employed, the chosen acceptor depending partly upon the solvent employed, for example, sodium hydroxide, potassium hydroxide, sodium bicarbonate, sodium carbonate, triethyl amine, tributylamine, dimethyl aniline, pyridine, quinoline, etc.

The reaction between the hydrazino-substituted triazine and the acylated aminoarylsulfonyl halide may be carried out in any suitable manner but is preferably carried out in the presence of suitable solvents such as water, acetone, dioxane, tetrahydrofurane, benzene, toluene, cyclohexane, etc. or mixtures of solvents. The choice of the solvent depends largely upon economic considerations and upon the solubility of the starting reactants. The reaction may be carried out at normal, sub-normal or at elevated temperatures and at atmospheric, sub-atmospheric or super-atmospheric pressure, but I prefer to carry out the reaction at normal temperatures and pressures.

The aminoarylsulfonylhydrazino triazines of this invention are readily prepared by hydrolyzing the corresponding acyl derivatives in the presence of water and preferably in the presence of an inorganic acid such as hydrochloric, sulfuric, phosphoric acids, etc. The equation may be represented as follows:

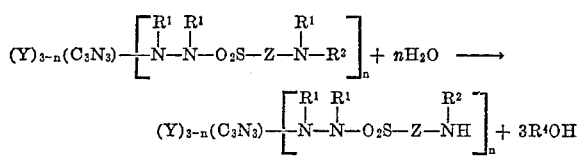

The aminoarylsulfonyl hydrazino-s-triazines of this invention may be prepared also by reacting a nitroarylsulfonyl halide with the hydrazino-s-triazine and thereafter reducing the nitro group, thus

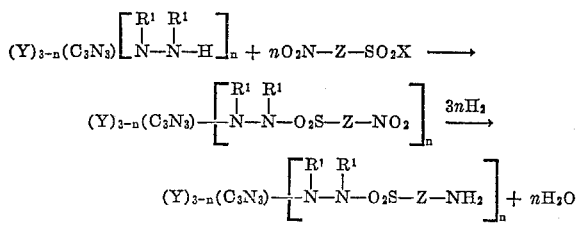

Alternately, the compounds of this invention may be prepared by reacting an acylaminoarylsulfonylhydrazine with a halotriazine in the presence of a hydrohalide acceptor, thus

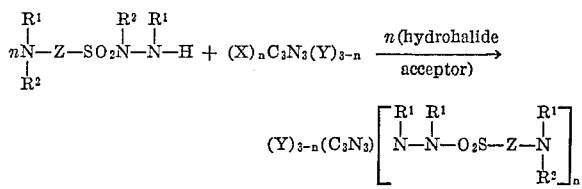

In the above equations X represents a halogen selected from the class consisting of chlorine, bromine and iodine but for economical reasons, chlorine is preferred, and Y, $R^1$ and $R^2$ have the same meaning as described hereinabove.

In order that those skilled in the art better may understand how the present invention may be carried into effect, the following examples are given by way of illustration and not by way of limitation.

*Example I*

14.5 parts of 2,4-diamino-6-chloro-s-triazine dissolved in 200 parts of water, and 11 parts of 64% aqueous hydrazine are added to a suitable reaction flask and the mixture stirred for 30 minutes, followed by refluxing for 30 minutes, after which the reaction mixture is cooled to room temperature. The solid product, removed by filtration, is recrystallized from water and dried, melting point 270° C. (dec.). Analysis for 2,4 diamino-6-hydrazino-s-triazine: calcd., C, 25.50%; N, 69.50%. Found: C, 25.75%; N, 69.80%.

*Example II*

The procedure of Example I is followed using an equivalent amount of 2,4 di-(methylamino)-6-chloro-s-triazine instead of 2,4-diamino-6-chloro-s-triazine and there is obtained 2,4-di-(methylamino)-6-hydrazino-s-triazine.

*Example III*

The procedure of Example I is followed using an equivalent amount of 2,4-di-(anilido)-6-chloro-s-triazine instead of 2,4-diamino-6-chloro-s-triazine and there is obtained 2,4 di-(anilido)-s-hydrazino triazine.

*Example IV*

The procedure of Example I is followed using an equivalent amount of symmetrical dimethyl hydrazine instead of hydrazine and there is obtained 2,4-diamino-6-(sym.dimethylhydrazino)-s-triazine.

*Example V*

141 parts of 2,4-diamino-6-hydrazino-s-triazine of Example I, 233.5 parts of acetylsulfanilyl chloride, and 40 parts of sodium hydroxide are refluxed in 1500 parts of water for 30 minutes and the reaction mixture allowed to cool, the product removed by filtration, washed with water, dried and recrystallized from water-alcohol mixtures and there is obtained a 75% yield of 2,4-diamino-6-acetylsulfanilylhydrazino-s-triazine. Analysis: calcd. for $CH_3CONHC_6H_4SO_2NHNH(C_3N_3)(NH_2)_2$: C, 39.1; N, 33.4. Found: C, 39.26; N, 33.48.

*Example VI*

The procedure of Example V is followed using the 2,4 di-(methylamino)-6-hydrazino triazine of Example II instead of the hydrazino triazine of Example I, and there is obtained 2,4 di-(methylamino)-6-acetylsulfanilyl-hydrazino-s-triazine.

*Example VII*

The procedure of Example V is followed using the hydrazino derivative of Example III and there is obtained 2,4-diamino-6-(acetylsulfanilyl-sym.dimethylhydrazino)-s-triazine, $$CH_3CONHC_6H_4SO_2N(CH_3)N(CH_3)(C_3N_3)(NH_2)_2$$

*Example VIII*

This example illustrates the preparation of substituted arylsulfonyl hydrazides used in the production of the compounds of this invention. A solution of one mole of hydrazine (64% aqueous) in an equal volume of water or ethanol is prepared in a suitable flask equipped with agitator and thermometer and cooled to 0–10° C. in an ice bath. One-half mole of acetylsulfanilyl chloride is added in small portions over a period of one and one-half hours, and the reaction mixture agitated for an additional one and one-half hours at ice bath temperature. More water or ethanol is added as needed, during the course of addition, to allow for complete mixing and to prevent caking of the solids. The crude product is collected by filtration, washed with water and toluene and dried in a vacuum desiccator. The yield of acetylsulfanilylhydrazine is 90%. Further purification is accomplished by dissolving the crude product in boiling water, filtering and cooling the solution immediately.

When methyl hydrazine, phenyl hydrazine, or sym.dimethyl hydrazine is used instead of hydrazine in the above procedure, the corresponding substituted hydrazine derivative is obtained.

*Example IX*

Cyanuric chloride (0.05 m.) and sodium bicarbonate (0.05 m.) are slurried in 100 ml. of a 3:1 dioxane:water mixture in a 250 ml. three-necked flask equipped with agitator and thermometer and cooled to 0–10° C. in an ice bath. The acetylsulfanilylhydrazine (0.05 m.) is added in small portions over a period of one-half hour and the reaction mixture agitated for an additional one hour at ice bath temperature and poured into 400 ml. of ice water. The product, which solidifies on standing, is collected by filtration, washed with water and toluene and dried in a vacuum desiccator and there is obtained a 74.8% yield of 2,4-dichloro-6-acetylsulfanilylhydrazido-s-triazine as a dihydrate, $$CH_3CONHC_6H_4SO_2NHNH(C_3N_3)Cl_2 \cdot 2H_2O$$

M.P. 300° C. In a similar manner are the corresponding substituted triazines prepared from the substituted acetylsulfanilylhydrazines of Example VIII.

*Example X*

This example describes a general procedure for the preparation of 2,4-diamino-6-acetylsulfanilylhydrazido-s-triazines. A slurry of the 2,4-dichloro-6-acetylsulfanilylhydrazido-s-triazine (0.01 m.) in 100 ml. of water is prepared in a 300 ml. three-neck flask equipped with agitator, reflux condenser and dropping funnel. A solution of the desired amine (0.02 m.) in 25 ml. of water is added over a period of fifteen minutes and the reaction mixture heated to reflux. A few drops of phenolphthalein indicator solution is added and 10 ml. of 2 N sodium hydroxide (0.02 m.) is added over a period of fifteen to thirty minutes at such rate that the solution is always neutral or just slightly basic. The reaction mixture is refluxed for two to three hours, cooled and filtered. The crude product is washed with water, recrystallized from the appropriate solvent after clarification with activated charcoal (Norite A or Darco G) and dried in a vacuum oven at 100° C. for twelve to twenty-four hours. The procedure is illustrated by the synthesis of the following compounds.

in 50 ml. of toluene is added over a period of two hours and the reaction mixture refluxed for an additional five hours. The hot toluene solution is evaporated to one-fourth volume, filtered, and the solid recrystallized from alcohol-water solvent after clarification with activated charcoal and dried in a vacuum oven at 100° C. for twelve to twenty-four hours.

*Example XI*

The sulfanilylhydrazido-s-triazines of this invention are prepared by hydrolyzing the corresponding acyl derivatives, e.g., the 2,4-diamino-6-acetylsulfanilylhydrazido-s-triazine (0.01 m.) is dissolved in 30 ml. of ethanol, to which 5 ml. of concentrated hydrochloric acid (0.05 m.) is added, in a 100 ml. flask equipped with a reflux condenser. The solution is refluxed on a steam bath for one to two hours, cooled and made basic to phenolphthalein with 2 N sodium hydroxide. The crude product is precipitated by flooding the solution with 300 ml. of water collected by filtration, washed with water, and recrystallized after clarification with activated charcoal and dried in a vacuum oven at 100° C. for twelve to twenty-four hours. From the compounds of Example X, the following free bases are prepared.

| Compound | M.P., °C. | Found Percent C | Found Percent N |
|---|---|---|---|
| $NH_2C_6H_4SO_2NHNH(C_3N_3)[N(CH_3)_2]_2$ | 212.5–213.5 | 44.51 | 31.87 |
| $NH_2C_6H_4SO_2NHNH(C_3N_3)[N(C_2H_5)_2]_2$ | 175.0–159.0 | 50.25 | 27.02 |
| $NH_2C_6H_4SO_2NHNH(C_3N_3)[N(CH_2CH_2)_2O]_2$ | 239.0–240.0 | 47.01 | 25.44 |
| $NH_2C_6H_4SO_2NHNH(C_3N_3)[N(CH_2CH_2)_2CH_2]_2$ | 223.0–224.0 | 52.84 | 26.15 |
| $NH_2C_6H_4SO_2NHNH(C_3N_3)[N(CH_2CH_2)_2CH_2CH_2]_2$ | 226.0–227.0 | 50.26 | 27.75 |

In a similar manner is 2,4 diamino-6-sulfanilylhydrazido-s-triazine, $NH_2C_6H_4SO_2NHNH(C_3N_3)(NH_2)_2$ prepared from its acetyl derivative; and the same compound is obtained by the reduction of $$O_2NC_6H_4NHNH(C_3N_3)(NH_2)_2$$

| Compound | M.P., °C. | Found Percent C | Found Percent N |
|---|---|---|---|
| $CH_3CONHC_6H_4SO_2NHNH(C_3N_3)[N(CH_3)_2]_2$ | 213–215 | 45.96 | 28.23 |
| $CH_3CONHC_6H_4SO_2NHNH(C_3N_3)[N(C_2H_5)_2]_2$ | 187–188 | 50.75 | 24.96 |
| $CH_3CONHC_6H_4SO_2NHNH(C_3N_3)[N(CH_2CH_2)_2O]_2$ | 252–253 | 47.48 | 23.79 |
| $CH_3CONHC_6H_4SO_2NHNH(C_3N_3)[N(CH_2CH_2)_2CH_2]_2$ | 222–223 | 53.18 | 23.52 |
| $CH_3CONHC_6H_4SO_2NHNH(C_3N_2)[N(CH_2CH_2)_2CH_2CH_2]_2$ | 214–215 | 50.41 | 25.06 |

This class of compounds may also be prepared in non-aqueous systems as for example: a slurry of 2,4-dichloro-6-acetylsulfanilylhydrazido-s-triazine (0.01 m.) in 75 ml. of toluene is prepared in a suitable flask equipped with agitator, reflux condenser and dropping funnel and heated to reflux. A solution of diethylamine (3.1 g., 0.04 m.)

*Example XII*

Forty-five (45) parts of 2,4-diamino-6-sulfanilylhydrazido-s-triazine, 73 parts of 37.1% aqueous formaldehyde, 4 parts of 28% aqueous ammonia and 0.05 part of sodium hydroxide in 2.5 parts of water are mixed and refluxed for 15 minutes following which there is added 0.5 part of monochloroacetamide. A moldable composition is prepared from the condensation product by mixing therewith 35 parts of alpha cellulose flock and 0.2 part of zinc stearate and drying at 50° C. A well-cured molded piece having a well-knit and homogeneous structure is obtained by molding a sample of the dried and ground molding compound for 3 minutes at 135° C. under a pressure of 2000–3000 pounds per square inch, and the water absorption of the molded piece is less than 0.2%.

*Example XIII*

A heat-convertible molding composition comprising 55–65 parts of potentially reactive urea-formaldehyde partial condensation product, a small amount of curing agent, 35–45 parts of alpha cellulose flock are dried and ball milled with 2–10 parts of each of the following triazines as plasticizers:

(a) 2,4 di-(dimethylamino)-6-acetylsulfanilylhydrazido-s-triazine;
(b) 2,4 dimorpholino-6-acetylsulfanilylhydrazido-s-triazine;
(c) 2,4 dipiperazino-6-acetylsulfanilylhydrazido-s-triazine;

in the presence of the usual mold lubricants, dyes, etc. The finely ground powder is densified in the usual manner and molded at 135–150° C. at a pressure of 2000 pounds per square inch. In a similar way molding compositions and articles are prepared wherein the described plasticizer is omitted from the formulation. In all cases better knitting and fusion takes place and there is higher plastic flow per unit time in compositions containing the plasticizer as compared with the plasticizer-free compositions. Furthermore, there is no decrease in water resistance of the molded articles prepared from the plasticized aminoplast resin.

*Example XIV*

One mole of trimethyl cyanurate, one mole of acetylsulfanilylhydrazine are mixed in a liter of methanol at 30° C. and kept at this temperature for 24 hours, followed by removal of the methanol by evaporation at reduced pressure at 30° C. and there is obtained 2,4-dimethoxy-6-acetylsulfanilylhydrazino-s-triazine, which is useful as a plasticizer for the molding compositions of Examples XII and XIII.

*Example XV*

Three moles each of acetylsulfanilylhydrazine and sodium bicarbonate are reacted with one mole of cyanuric chloride according to the procedure of Example IX and there is obtained 2,4,6 tri-(acetylsulfanilylhydrazino)-s-triazine.

*Example XVI*

The 2,4,6 tri-(acetylsulfanilylhydrazino)-s-triazine of Example XV is hydrolyzed according to the procedure of Example XI and there is obtained 2,4,6 tri-(amino-benzenesulfonylhydrazino)-s-triazine which, when reacted with formaldehyde, produces a thermosetting resin.

*Example XVII*

One mole of cyanuric chloride is reacted wtih two moles of acetylsulfanilylhydrazine and two moles of sodium hydroxide according to the procedure of Example IX and then is further reacted with one mole of dimethylamine according to the procedure of Example X and there is obtained a crude reaction product containing 2,4-di(acetylsulfanilylhydrazino)-6-dimethylamino-s-triazine. When morpholine, piperidine, dibutylamine, etc. are used in this procedure instead of dimethylamine, the corresponding derivatives are obtained.

*Example XVIII*

One mole of 2,4 dichloro-6-acetylsulfanilylhydrazino-s-triazine is dissolved in one liter of methyl alcohol containing two moles of sodium hydroxide according to the procedure of Example X and there is obtained 2,4 dimethoxy-6-acetylsulfanilylhydrazino-s-triazine. When this compound is hydrolyzed according to the procedure of Example XI, there is obtained 2,4-dihydroxy-6-amino-benzenesulfonylhydrazino-s-triazine.

What I claim is new and desire to secure by Letters Patent of the United States is:

1. A chemical compound of the formula $$[Y]_{3-n}-\left[\begin{array}{c} N=C \\ \| \quad \| \\ C \quad C \\ \diagdown N \diagup \end{array}\right]-\left[\begin{array}{c} R^1 \ R^1 \quad\quad R^1 \\ | \ \ | \quad\quad | \\ N-N-O_2S-Z-N-R^2 \end{array}\right]_n$$

where $n$ represents an integer and is at least 1 and not more than 3, $R^1$ represents a member of the class consisting of hydrogen and monovalent hydrocarbon radicals, $R^2$ represents a member of the class consisting of hydrogen and carboxylic acyl radicals of no more than 19 carbon atoms and having no substituent group therein other than selected from the class consisting of saturated aliphatic, cycloaliphatic and aromatic hydrocarbon groups and monochloro-substituted aromatic hydrocarbon groups, and Y represents a member of the class consisting of —Br, —Cl, —OR$^1$, and $$-N\diagup\!\!\!\!\diagdown\begin{array}{c} R^3 \\ R^4 \end{array}$$

radicals, wherein $R^3$ and $R^4$ each represent $R^1$ and the pair of radicals $R^3$ and $R^4$ together with the nitrogen atom constitute a member selected from the group of five- to six-membered unsubstituted alkylenimino radicals and the morpholino radical, and Z represents a divalent radical selected from the class consisting of divalent aromatic hydrocarbon radicals having no more than 12 carbon atoms therein and the monochloro, monobromo and monoiodo derivatives thereof.

2. A compound having the formula $$CH_3CONHC_6H_4SO_2NHNH-C_3N_3(NH_2)_2$$

wherein $C_3N_3$ represents the trivalent symmetrical triazine nucleus.

3. A compound having the formula $$CH_3CONHC_6H_4SO_2NHNH-C_3N_3(NHCH_3)_2$$

wherein $C_3N_3$ represents the trivalent symmetrical triazine nucleus.

4. A compound having the formula $$CH_3CONHC_6H_4SO_2NHNH-C_3N_3Cl_2$$

wherein $C_3N_3$ represents the trivalent symmetrical triazine nucleus.

5. A compound having the formula $$CH_3CONHC_6H_4SO_2NHNH-C_3N_3[N(CH_3)_2]_2$$

wherein $C_3N_3$ represents the trivalent symmetrical triazine nucleus.

6. A compound having the formula $$CH_3CONHC_6H_4SO_2NHNH-C_3N_3[N(C_2H_5)_2]_2$$

wherein $C_3N_3$ represents the trivalent symmetrical triazine nucleus.

7. A compound having the formula $$NH_2C_6H_4SO_2NHNH-C_3N_3[N(CH_3)_2]_2$$

wherein $C_3N_3$ represents the trivalent symmetrical triazine nucleus.

8. A compound having the formula $$NH_2C_6H_4SO_2NHNH-C_3N_3(N\diagup\!\!\!\!\diagdown\begin{array}{c}CH_2CH_2\\CH_2CH_2\end{array}\!\!\!O)_2$$

wherein $C_3N_3$ represents the trivalent symmetrical triazine nucleus.

9. A compound having the formula $$NH_2C_6H_4SO_2NHNH-C_3N_3[N(C_2H_5)_2]_2$$

wherein $C_3N_3$ represents the trivalent symmetrical triazine nucleus.

10. A compound having the formula $$NH_2C_6H_4SO_2NHNH-C_3N_3(NH_2)_2$$

wherein $C_3N_3$ represents the trivalent symmetrical triazine nucleus.

11. A process of preparing a chemical compound having the formula

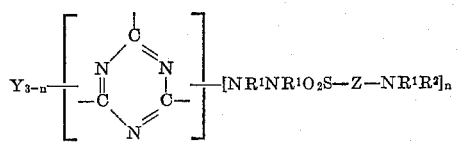

wherein $n$ represents an integer having a value of at least 1 and no more than 3, $R^1$ represents a member of the class consisting of hydrogen and monovalent hydrocarbon radicals, $R^2$ represents a member of the class consisting of hydrogen and carboxylic acyl radicals and derivatives of said acyl radicals having no substituent group therein other than selected from the class consisting of saturated aliphatic, cycloaliphatic and aromatic hydrocarbon groups and monochloro-substituted aromatic hydrocarbon groups, said acyl radicals and derivatives of said acyl radicals each having no more than 19 carbon atoms therein, and Y represents a member of the class consisting of —Br, —Cl, —OR¹ and —NR³R⁴ radicals, wherein $R^3$ and $R^4$ each represent $R^1$ and the pair of radicals $R^3$ and $R^4$ together with the nitrogen atom constitute a member selected from the class consisting of five- and six-membered unsubstituted alkylenimino radicals and the morpholino radical, and Z represents a divalent radical selected from the class consisting of divalent aromatic hydrocarbon radicals having no more than 12 carbon atoms therein and the monochloro, monobromo and monoiodo derivatives thereof; by reacting stoichiometric amounts of an aminoarylsulfonylhydrazine having the formula

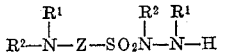

and a halotriazine having the formula $X_n(C_3N_3)Y_{3-n}$ in the presence of stoichiometric amount of a hydrohalide acceptor, in which formulas X is a halogen atom selected from the group consisting of chlorine, bromine and iodine, and the other symbols are as defined above; and when $R^2$ in the first above formula represents hydrogen, an additional step of hydrolysis is performed on the product of said reaction.

12. A process of claim 11 wherein said reaction is carried out in the presence of a solvent selected from the class consisting of water, acetone, dioxane, tetrahydrofurane, benzene, toluene, cyclohexane and mixtures thereof.

References Cited in the file of this patent

UNITED STATES PATENTS

| | | |
|---|---|---|
| 2,312,698 | D'Alelio | Mar. 2, 1943 |
| 2,392,649 | D'Alelio | Jan. 8, 1946 |
| 2,513,826 | Sprung et al. | July 4, 1950 |
| 2,950,280 | Zimmer | Aug. 23, 1960 |

FOREIGN PATENTS

| | | |
|---|---|---|
| 901,650 | Germany | July 8, 1949 |
| 1,017,616 | Germany | Oct. 17, 1957 |

OTHER REFERENCES

Hackh's Chemical Dictionary, page 18, published by the Blakiston Co. (1944).

Lucas: Organic Chemistry (2d ed.), pages 86–89, published by the American Book Co. (1953).

Noller: Chemistry of Organic Compounds, pages 47–53, 127–133, 762–771, published by W. B. Saunders Co. (1951).

D'Alelio et al.: J. Org. Chem., vol. 25, No. 2, pages 202–203 (1960).